July 22, 1952      T. T. TUTTLE      2,604,109
SPEED CONTROL VALVE UNIT
Filed March 14, 1947      2 SHEETS—SHEET 1
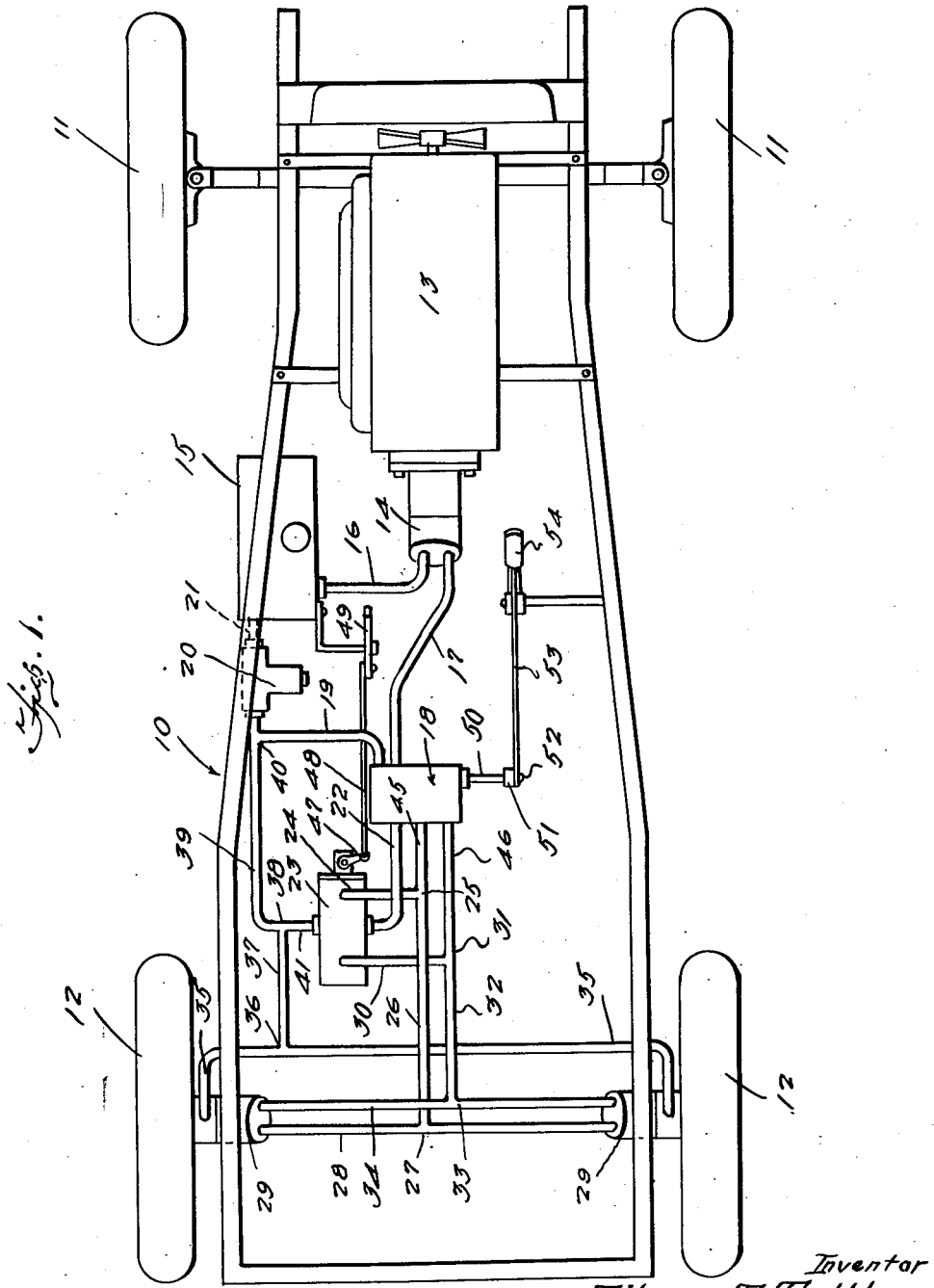
Inventor
Tilmon T. Tuttle
By
McMorrow, Berman & Davidson
Attorneys

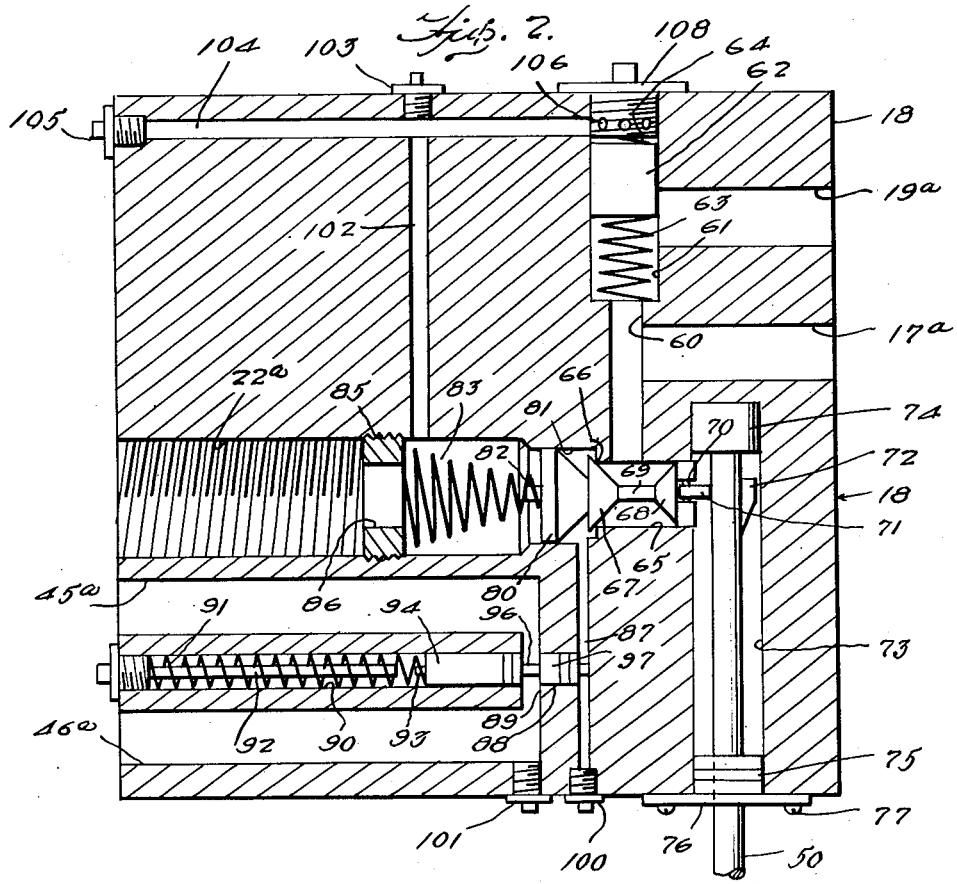
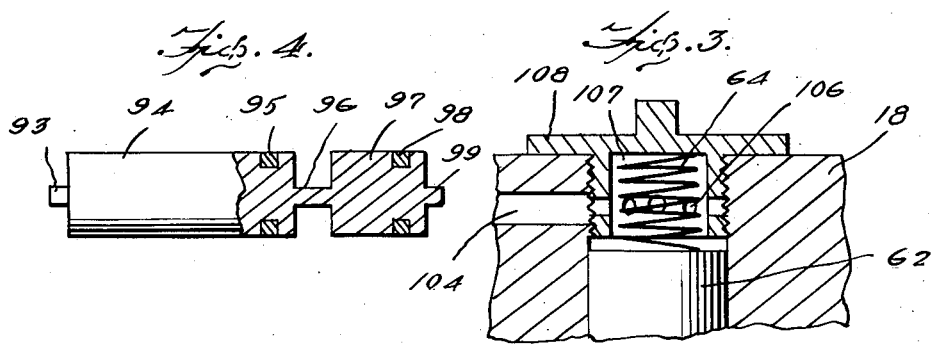

Patented July 22, 1952

2,604,109

UNITED STATES PATENT OFFICE 2,604,109

SPEED CONTROL VALVE UNIT

Tilmon T. Tuttle, Dayton, Ohio

Application March 14, 1947, Serial No. 734,614

2 Claims. (Cl. 137—115)

This invention relates to a speed control valve unit, and more particularly to such a unit as applicable to motor vehicles.

A primary object of this invention is the provision of an improved valve unit for a hydraulic drive system adapted to reduce the loss of power between the engine and the driving device for the wheels of a vehicle.

A further object of the invention is the provision of such a valve unit which accomplishes the foregoing objects by the elimination of the conventional clutch, transmission, universal, drive shaft, and differential.

A further object of the invention is the provision of an improved speed control valve for the vehicle so arranged and constructed as to permit the engine to run at a constant speed, and, by control of the quantity of the fluid admitted to the drive motors associated with the wheels of a vehicle, to control the speed thereof.

An additional object of the invention is the provision of a control valve unit for hydraulic drive systems which is sturdy and durable in construction, reliable and efficient in operation, and relatively simple and inexpensive to manufacture, assemble and install.

Still other objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a schematic top plan view of a motor vehicle utilizing the valve unit of the instant invention, the body and certain other parts thereof being omitted for the sake of clarity.

Figure 2 is a horizontal sectional vew taken substantially through the center line of the speed control valve of the system.

Figure 3 is a fragmentary sectional view showing a constructional detail.

Figure 4 is a view partially in elevation and partially in section disclosing a further constructioanal detail.

Having reference now to the drawings, and more particularly to Figure 1, there is generally indicated at 10 the frame of a motor vehicle of any desired conventional type provided with front wheels 11, rear wheels 12, and an engine 13 of any desired conventional type. The engine 13 is directly and operatively connected to a pump 14 which is supplied with hydraulic fluid from a reservoir 15 through a main supply pipe 16. A discharge pipe 17 leads from the pump to a speed control valve 18 to be more fully described hereinafter. From the valve 18 a return line 19 leads to a filter 20, from which a pipe 21 returns fluid to the reservoir 15.

The valve 18 is also provided with an operating connection 22 that leads to a reverse valve 23 of the slide valve type. From the reverse valve 23 an operating connection 24 leads to a T 25 from which a pipe 26 leads through a T 27 to a transverse pipe 28, which in turn is connected, at its opposite ends, with hydraulic driving motors 29 associated with the rear wheels 12.

The reverse valve 23 is also provided with a reverse connection 30 which extends through a T 31 to a pipe 32 connected by a T 33 with a transverse pipe 34, which also communicates with the motor units 29 for operatively driving the motors in the reverse direction. The motor units 29 are also provided with return, drain, or seepage connections 35 which connect through a T 36, a pipe 37, a T 38, a pipe 39, and a T 40 to the filter 20 and fluid reservoir 15. The T 40 also communicates with the return line 19 and the T 38 is connected through a pipe 41 to the return side of the valve 23.

The T's 25 and 31 are connected through pipes 45 and 46, respectively, back to the control valve unit 18.

Means of conventional type are provided for directing the flow of fluid from the reverse valve 23 through either pipes 24, 30 or 41, as may be desired, and take the form of a pivotally mounted lever 47 connected to an operating rod 48 movable by a control lever 49 which extends into the body of the vehicle at a point adjacent the driver. The arrangement of this unit is conventional, and may be of any desired type of valve mechanism adapted for the direction of fluid into one of the pipes mentioned for a purpose to be more fully described hereinafter.

Means are also provided for controlling the valve unit 18 in a manner to be described in detail hereinafter, and include a rotatable rod 50 extending into the unit 18 and connected at its opposite end to an eccentric 51 to which is secured, as by means of a pin 52, an operating rod 53 which extends to an accelerator pedal 54 suitably mounted in the body of the vehicle. The arrangement is such that movement of the accelerator pedal 54 tends through the eccentric 51 to rotate the rod 50.

Referring now in detail to the speed control valve unit 18, as best shown in Figure 2, the inlet pipe 17 from pump 14 communicates with a passage 17a, which in turn enters a bore 60 which communicates with a recess 61 within which is positioned a balanced spring-loaded valve 62, the loading being effected by springs 63 and 64 on opposite sides thereof. An outlet 19a communicates with recess 61 and has connected thereto the outlet pipe 19.

The other end of the bore 60 communicates with a recess 65, the upper extremity of which is provided with a valve seat 66 against which is adapted to seat a valve 67. A second valve member 68 connected to the valve 67, as by means of a valve stem 69, seals recess 65 against the passage of fluid therethrough, and is provided at its lower extremity with a bracket 70, which carries a rotatable wheel 71. The wheel 71 is adapted to abut an eccentric 72 carried by the shaft 50 which extends into a bore 73 in the unit 18. The rod 50 is provided interiorly of the bore 73 with a cylindrical guide member 74, and, adjacent the outer extremity of the bore with sealing rings 75. A suitable fitting 76 secured to the exterior of the unit 18, as by screws 77, holds the parts in related assembly.

The valve member 67 has secured thereto a second valve 80 moving in a recess 81 and provided with a spring-seating pin 82, surrounding which is one end of a coil spring 83, positioned in outlet passageway 22a which communicates with main outlet pipe 22.

The opposite end of the spring 83 seats against a threaded spring-retaining collar 85 suitably threaded within the passageway 22a and provided with a central aperture 86.

A bore 87 extends from the recess 81 to a transverse bore 88 which in turn communicates with a bore 89 parallel to the bore 87 which connects two parallel bores 45a and 46a, connected to the circulatory pipes 45 and 46, respectively. A central partition between the passageways or bores 45a and 46a contains a bore 90 within which is positioned a spring 91 surrounding a spring guide rod and stop 92 adapted to be engaged by a pin 93 carried by a valve member 94. Member 94 is provided with a sealing ring 95 adapted to prevent the passage of fluid into the bore 90, and is connected, as by means of a reduced stem 96, to a second valve member 97 provided with a sealing ring 98, and a stop pin 99, the valve portion 97 being adapted to seat in the bore 88. It will be understood that fluid pressure in the passageway 87 will force the valve 97, and hence the valve 94, outwardly with respect to the passage 87 to close the passageway 89, the movement of the parts being limited by the abutment of the pin 93 against the rod 92, and that such movement will effectively close the passageway 89.

Bores 87 and 89, respectively, are closed by threaded caps 100 and 101 to seal the ends thereof, the bores being machined from the side wall of the unit 18.

A bore 102 extends from the main outlet 22a outwardly through the wall of the member 18, its extremity being closed by a threaded cap 103, and intersects a transverse bore 104, its outer end being closed by a screw cap 105, which communicates with the recess 61 on the adjacent side of the balance valve 62. Suitable apertures 106 permit the passage of fluid from the bore 104 into the portion of the recess 61 on the adjacent side of valve 62 in order to balance the same in the manner and for a purpose to be more fully described hereinafter. As best shown in Figure 3, the spring 64 is seated in an aperture 107 in a threaded cap 108 adapted threadedly to engage in the outer extremity of the recess 61.

From the foregoing the operation of the mechanism should now be readily understandable. In operating the vehicle, the engine 13 may be started and adjusted to run at a desired R. P. M. at maximum efficiency. When it is desired to retain the vehicle in stationary position, the reverse valve 23 may be adjusted to neutral position, and the accelerator 54 released to adjust the parts to the position disclosed in Figure 2. Under these conditions, it will be seen that the pressure of fluid in the inlet 17a is sufficient to bias the valve 62 to open position, since the loading of the spring 83 is in excess of that of the spring 63, and, the valve 67 being firmly seated against its seat 66, fluid from the pump 14 will pass through the inlet 17a, the bore 60, into the recess 61, and thence outwardly through the outlet 19a to pipe 19, returning through filter 21 to reservoir 15. Correspondingly, due to the absence of fluid pressure in the bore 87, the spring 91 will bias the valve 94 to open position, in such manner that fluid from the driving motors 29 is permitted to circulate through pipes 45 and 46 into the passageways 45a and 46a, thus precluding blocking of the wheels and their associated motors 29, whereby coasting may be achieved.

When it is desired to apply power to the rear wheels 12 of the vehicle, pressure on the accelerator 54 will rotate the rod 50, which, through its eccentric 72, will open valve 67, the lower end of recess 65 being sealed by the valve 68, and admit fluid from the bore 60 into the recess 81, and correspondingly, into the bore 87. Fluid pressure of the bore 87 will cause valve member 97 to move outwardly closing the bore 89 and precluding free circulation of fluid in the pipes 26, 38, 32, 34, 45 and 46. Correspondingly, as the valve 80 is moved out of the recess 81, to open communication therewith with main outlet 22a, fluid passes through the bores 102 and 104 and the apertures 106 and threaded cap member 108 into the bore 60 on the side containing the spring 64, thus equalizing the pressure on opposite sides of the valve 62, and centering the same to close the outlet passage 19a. Under such conditions, and assuming that the reverse valve 23 is still in neutral position, the fluid circulates into the reverse mechanism 23 through the pipes 41 and 39, hence through T 40 to the filter 20 and back to the reservoir 15. Under such conditions, it will be readily seen that a braking effect is applied to the rear wheels, since, by virtue of the closure of the bore 89, circulation of the fluid through the motors 29 is precluded, and the fluid exercises a material braking effect.

However, when it is desired to move the vehicle forwardly, the lever 49 is shifted in such manner as to close off the pipe 41 and permit fluid to pass outwardly through the pipe 24 to the T 25, and thence through pipe 26 and T 27 to pipes 28 to energize the driving motors 29 which in turn rotate the wheels 12. After driving the motors 29, the fluid then returns through the return 35 and T 36, pipe 37 and T 38, through pipe 39 back to the filter 20, and thence to the reservoir 15.

Reverse driving movement is effected by moving the reverse valve in such manner as to close off the pipes 24 and 41 and pass fluid through the pipe 30 and T 31 to pipe 32, and thence through T 33 to pipe 34, the fluid from which, entering the motors on the opposite side thereof causes a reverse rotation of the wheels 12. The fluid under these conditions returns through the return 35 in the manner previously described to the reservoir 15.

It will now be seen that there is herein provided an improved valve control mechanism for a fluid drive system which is extremely flexible in operation and of maximum efficiency, the speed of the driving motors 29 being governed by the degree to which the valves 67 and 80 are opened, the speed of the engine remaining substantially constant at all times, which permits forward and backward movement of the vehicle at any desired rate of speed, which effects the braking action when desired, and which further permits coasting or idling of the motor without changing the R. P. M. thereof.

It will also be seen that there is herein provided a device which accomplishes all the objects of this invention, and others, including many advantages of great practical utility and commercial importance.

As various embodiments may be made of this inventive concept, and as various modifications may be made in the embodiment hereinbefore shown and described, it is to be understood that all matter herein is to be interpreted merely as illustrative and not in a limiting sense.

I claim:

1. A valve device for use with fluid transmission for vehicles, comprising a body portion having a first chamber of uniform diameter, a second chamber having large and small chamber sections leading into each other, a first communicating bore leading into one end of the first chamber and into the small chamber section, a main inlet bore communicating with one end of the first chamber, a main outlet bore leading into the side of the first chamber, a main discharge bore leading into the large chamber section, a second communicating bore leading into the main discharge bore and the first chamber near its opposite end, a third chamber, a circulating bore having a part thereof leading into the third chamber, a third communicating bore connecting the large chamber section and the third chamber, a first plunger valve in the first chamber to cover and uncover the main outlet bore, spring means engaging the first plunger valve to cause the same to cover the main outlet bore when the pressure is balanced upon opposite ends of the plunger valve, a valve unit mounted within the second chamber and including a small valve for closing the small chamber section and a large valve between said first and second communicating bores for closing the large chamber section, a spring to seat the small valve and large valve of the valve unit and being stronger than the spring means, a second plunger valve mounted in the third chamber and movable in response to the opening of said small valve of said valve unit to close the circulating bore, a spring to unseat the second plunger valve, and manually operated means to operate the valve unit for unseating the small and large valves.

2. A valve device for use with fluid transmission for vehicles, comprising a body portion having a first chamber of uniform diameter, a second chamber having large and small chamber sections leading into each other, a first communicating bore leading into one end of the first chamber and into the small chamber section, a main inlet bore communicating with one end of the first chamber, a main outlet bore leading into the side of the first chamber, a main discharge bore leading into the large chamber section, a second communicating bore leading into the main discharge bore and the first chamber near its opposite end, a third chamber, a circulating bore having a part thereof leading into the third chamber, a third communicating bore connecting the large chamber section and the third chamber, a first plunger valve in the first chamber to cover and uncover the main outlet bore, spring means engaging the first plunger valve to cause the same to cover the main outlet bore when the pressure is balanced upon opposite ends of the plunger valve, a valve unit mounted within the second chamber and including a small valve for closing the small chamber section and a large plunger valve between said first and second communicating bores for closing the large chamber section, the large plunger valve unseating after the small valve unseats, a spring to seat the small valve and large plunger valve of the valve unit and being stronger than the spring means, a second plunger valve mounted in the third chamber and movable in response to the opening of said small valve of said valve unit to close the circulating bore, a spring to unseat the second plunger valve, and manually operated means to operate the valve unit for unseating the small valve and large plunger valve.

TILMON T. TUTTLE.

REFERENCES CITED

The following references are of record in the file of this patent:

UNITED STATES PATENTS

| Number | Name | Date |
|---|---|---|
| 527,575 | Wood | Oct. 16, 1894 |
| 1,008,202 | Schmucker | Nov. 7, 1911 |
| 1,145,317 | Killman | July 6, 1915 |
| 1,912,060 | Beattie | May 30, 1933 |
| 2,221,308 | Dischert | Nov. 12, 1940 |